US012230042B2

(12) United States Patent
Chen

(10) Patent No.: US 12,230,042 B2
(45) Date of Patent: Feb. 18, 2025

(54) METHOD AND SYSTEM FOR IMPLEMENTING ADAPTIVE FEATURE DETECTION FOR vSLAM SYSTEMS

(71) Applicant: GUANGDONG OPPO MOBILE TELECOMMUNICATIONS CORP., LTD., Guangdong (CN)

(72) Inventor: Kevin Chen, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 421 days.

(21) Appl. No.: 17/940,455

(22) Filed: Sep. 8, 2022

(65) Prior Publication Data

US 2023/0005172 A1 Jan. 5, 2023

Related U.S. Application Data

(63) Continuation of application No. PCT/CN2021/076064, filed on Feb. 8, 2021.
(Continued)

(51) Int. Cl.
*G06T 7/579* (2017.01)
*G06T 7/246* (2017.01)
(Continued)

(52) U.S. Cl.
CPC ............... *G06V 20/64* (2022.01); *G06T 7/246* (2017.01); *G06T 7/579* (2017.01); *G06V 10/44* (2022.01);
(Continued)

(58) Field of Classification Search
CPC ......... G06F 18/253; G06T 2207/10016; G06T 2207/10024; G06T 2207/20016;
(Continued)

(56) References Cited

U.S. PATENT DOCUMENTS

2024/0104771 A1* 3/2024 Zelek ...................... G06T 7/579

FOREIGN PATENT DOCUMENTS

| CN | 109029433 A | 12/2018 |
| WO | 2016182754 A1 | 11/2016 |
| WO | 2019143864 A1 | 7/2019 |

OTHER PUBLICATIONS

Abdul Kadir, H. et al Features Detection and Matching for Visual Simultaneous Localization and Mapping (VSLAM) «2013 IEEE International Conference on Control System, Computing and Engineering, Nov. 29-Dec. 1, 2013, Penang, Malaysia» Dec. 1, 2013 (6 pages).

(Continued)

*Primary Examiner* — Michael J Vanchy, Jr.
(74) *Attorney, Agent, or Firm* — Young Basile Hanlon & MacFarlane, P.C.

(57) ABSTRACT

A method includes receiving a first image, receiving a motion dataset, determining a motion level, determining an initialization state, and determining a tracking level. In a first condition, the method includes generating a first image pyramid, detecting a plurality of features in the first image pyramid using a first detector threshold, and generating a first set of detected keypoints from the plurality of features. In a second condition, the method includes generating a second image pyramid, detecting the plurality of features in the second image pyramid using a second detector threshold, the second detector threshold being less restrictive than the first detector threshold, and generating a second set of detected keypoints. In a third condition, the method includes detecting the plurality of features in the first image according to the first detector threshold and generating a third set of detected keypoint.

20 Claims, 8 Drawing Sheets

Related U.S. Application Data

(60) Provisional application No. 62/987,028, filed on Mar. 9, 2020.

(51) Int. Cl.
*G06V 10/44* (2022.01)
*G06V 10/74* (2022.01)
*G06V 20/20* (2022.01)
*G06V 20/64* (2022.01)

(52) U.S. Cl.
CPC .......... *G06V 10/443* (2022.01); *G06V 10/761* (2022.01); *G06V 20/20* (2022.01); *G06T 2207/20016* (2013.01)

(58) Field of Classification Search
CPC .......... G06T 2207/20076; G06T 7/246; G06T 7/579; G06V 10/44; G06V 10/443; G06V 10/761; G06V 20/20; G06V 20/64
See application file for complete search history.

(56) References Cited

OTHER PUBLICATIONS

Marmol, A. et al.Evaluation of Keypoint Detectors and Descriptors in Arthroscopic Images for Feature-Based Matching Applications (IEEE Robotics and Automation Letters» Oct. 31, 2017 No. 4 vol. 2 (8 pages).
International search report and Written Opinion of the International Search Authority for PCT/CN2021/076064 mailed May 8, 2021 (9 pages).

\* cited by examiner

METHOD AND SYSTEM FOR IMPLEMENTING ADAPTIVE FEATURE DETECTION FOR vSLAM SYSTEMS

CROSS-REFERENCE TO RELATED APPLICATION(S)

The present disclosure is a continuation-application of International (PCT) Patent Application No. PCT/CN2021/076064 filed on Feb. 8, 2021, which claims priority of U.S. Provisional Patent Application No. 62/987,028, filed on Mar. 9, 2020, the entire contents of both of which are hereby incorporated by reference.

TECHNICAL FIELD

The present disclosure relates to the field of augmented reality, and in particular, to a method and system for implementing adaptive feature detection for vSLAM systems, and a non-transitory computer-readable storage medium.

BACKGROUND

Augmented Reality (AR) superimposes virtual content over a user's view of the real world. With the development of AR software development kits (SDK), the mobile industry has brought mobile device AR platforms to the mainstream. An AR SDK typically provides six degrees-of-freedom (6 DoF) tracking capability. A user can scan the environment using a camera included in an electronic device (e.g., a smartphone or an AR system), and the electronic device performs visual simultaneous localization and mapping (vSLAM) in real time. Implementing vSLAM in mobile devices can be done using a vSLAM unit to detect features of real-world objects and to track those features as the mobile device moves through its environment in three-dimensions.

Despite the progress made in the field of AR, there is a need in the art for improved methods and systems related to AR.

SUMMARY

The present disclosure relates generally to methods and systems related to augmented reality applications. More particularly, embodiments of the present disclosure provide methods and systems for adaptive feature detection using variable pyramid level and detector threshold values. The disclosure is applicable to a variety of applications involving vSLAM operations, including, but not limited to, computer vision-based online 3D modeling, AR visualization, facial recognition, robotics, and autonomous vehicles.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of adaptive feature detection in visual simultaneous localization and mapping (vSLAM) processing. In such methods, a computer system receives a first image, receives a motion dataset, determines a motion level, determines an initialization state, and determines a tracking level. The method further includes a determination of one of at least three conditions. In a first condition, the method includes generating a first image pyramid, detecting a plurality of features in the first image pyramid using a first detector threshold, and generating a first set of detected keypoints from the plurality of features at least in part by keypoint fusion and selection. In a second condition, the method includes generating a second image pyramid, detecting the plurality of features in the second image pyramid using a second detector threshold, the second detector threshold being less restrictive than the first detector threshold, and generating a second set of detected keypoints at least in part by keypoint fusion and selection. In a third condition, the method includes detecting the plurality of features in the first image according to the first detector threshold and generating a third set of detected keypoints.

Another general aspect includes a computer system including one or more processors and one or more memories storing computer-readable instructions that, upon execution by the one or more processors, configure the computer system to receive a first image, receive a motion dataset, determine a motion level, determine an initialization state, and determine a tracking level. The computer-readable instructions further configure the computer system to determine one of at least three conditions. In a first condition, the computer system is further configured to generate a first image pyramid, detect a plurality of features in the first image pyramid using a first detector threshold, and generate a first set of detected keypoints from the plurality of features at least in part by keypoint fusion and selection. In a second condition, the computer system is further configured to generate a second image pyramid, detect the plurality of features in the second image pyramid using a second detector threshold, the second detector threshold being less restrictive than the first detector threshold, and generate a second set of detected keypoints at least in part by keypoint fusion and selection. In a third condition the computer system is further configured to detect the plurality of features in the first image according to the first detector threshold and generate a third set of detected keypoints.

Another general aspect includes one or more non-transitory computer-storage media storing instructions that, upon execution on a computer system, cause the computer system to perform operations including receiving a first image, receiving a motion dataset, determining a motion level, determining an initialization state, and determining a tracking level. The operations further include determining one of at least three conditions. In a first condition, the operations further include generating a first image pyramid, detecting a plurality of features in the first image pyramid using a first detector threshold, and generating a first set of detected keypoints from the plurality of features at least in part by keypoint fusion and selection. In a second condition, the operations further include generating a second image pyramid, detecting the plurality of features in the second image pyramid using a second detector threshold, the second detector threshold being less restrictive than the first detector threshold, and generating a second set of detected keypoints at least in part by keypoint fusion and selection. In a third condition, the operations further include detecting the plurality of features in the first image according to the first detector threshold and generating a third set of detected keypoints.

BRIEF DESCRIPTION OF DRAWINGS

The drawings herein are incorporated into and form a part of the description, showing embodiments in accordance with the present disclosure, and are configured together with the description to explain the principles of the present disclosure. Apparently, the drawings described below are only some embodiments of the present disclosure. One skilled in the art may acquire other drawings based on these drawings, without making any inventive work.

DETAILED DESCRIPTION

Figure 1:
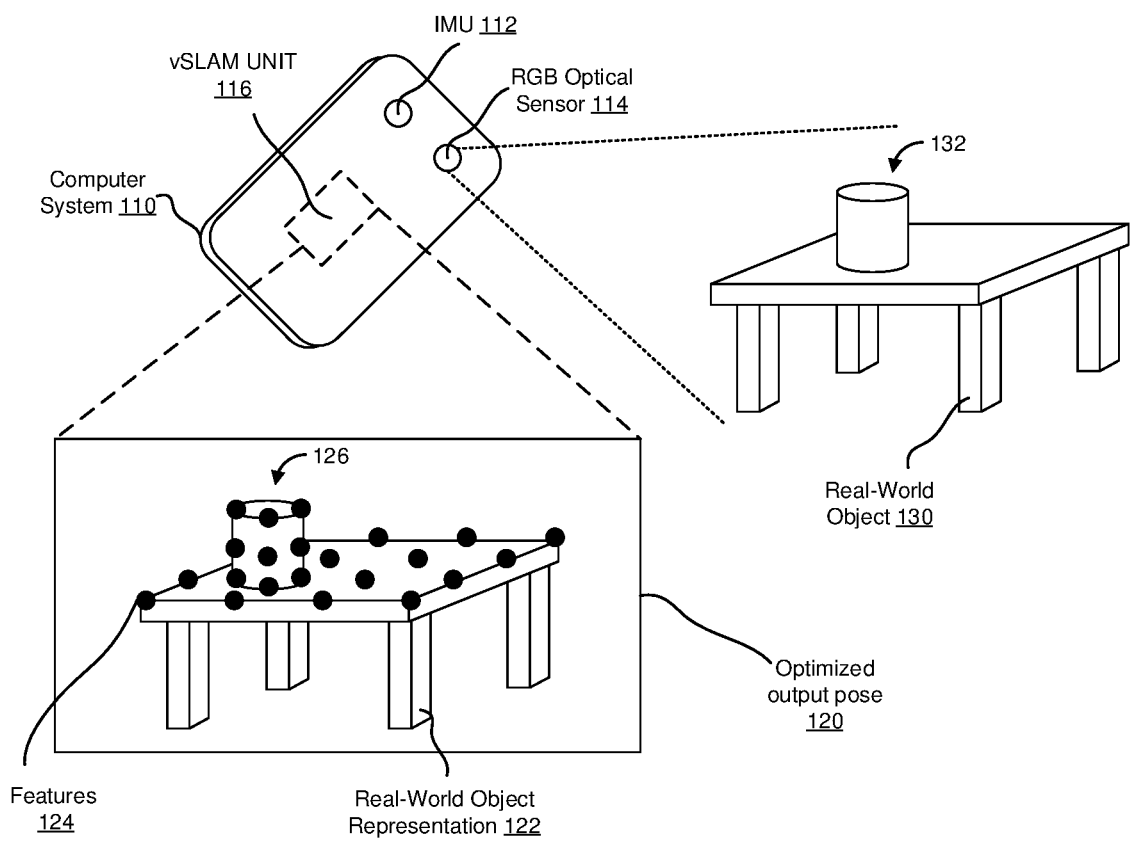
FIG. 1 illustrates an example of a computer system that includes an inertial measurement unit and an RGB optical sensor for feature detection and tracking applications, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a vSLAM unit including a detection strategy processor, a motion monitor, and a tracking performance monitor. The robustness of vSLAM unit operations, in particular feature detection and tracking, may be improved by introducing the detection strategy processor, the tracking performance monitor, and the motion monitor in communication with the vSLAM unit. The detection strategy processor may implement a pyramid level detection technique to improve the robustness of detection of features in images received by the vSLAM unit. The detection strategy processor may employ variable detection threshold values and variable pyramid level values during feature detection operations as a function of an initialization state, a motion level, and/or a tracking level. In this way, the detection strategy processor may reduce the effect of initialization errors and motion on feature detection and tracking operations carried out by the vSLAM unit.

In some embodiments, the detection strategy processor may determine an initialization state describing whether the vSLAM unit is initialized. The detection strategy processor may also receive a motion level, based at least in part on motion data received from an inertial measurement unit (IMU), and determined by the motion monitor. The detection strategy processor may also receive a tracking level, based at least in part on the error in tracking features as determined by the tracking performance monitor. Based at least in part on the initialization state, the motion level, and/or the tracking level, the detection strategy processor may implement feature detection (also referred to as keypoint detection) using an image pyramid including a number of levels described by a pyramid level value and applying a detector threshold to feature detection operations. The detection strategy processor may modify the pyramid level value and/or the detector threshold as a function of the initialization state, the motion level, and/or the tracking level. The detection strategy processor may generate a set of detected keypoints for the vSLAM unit to employ in feature tracking operations on subsequent images received by the vSLAM unit.

In an illustrative example, a smart phone app may include an AR function to superimpose animated elements onto objects in the real world. For example, the animated elements could be signs, floral motifs, cartoon animals, etc. The smart phone app may, for example, detect and track specific objects so that a specific animated element only appears on the screen of the phone when a specific object is in the field of view of the camera. To correctly place an animated element in the display field at the appropriate size, perspective, and position to appear as though it were interacting with real world objects, the smart phone app needs information about the surfaces of the objects in the environment around the phone and the position and orientation of the phone (also referred to as the pose). In some cases, this information includes images captured by the camera and information about the motion of the phone in the environment. To determine the pose of the camera, the vSLAM unit may perform an initialization operation, whereby it calculates an initial mapping of three dimensional features into a multi-dimensional coordinate system and further provides an initial pose of the camera relative to the coordinate system.

The vSLAM unit may then initiate feature detection and tracking operations using images as they are received from the camera, such that the objects in the field of view of the camera are tracked. Receiving an image, the vSLAM unit may perform feature tracking on that image using a set of detected keypoints determined either during initialization or in a prior cycle of feature detection. The results of feature tracking may be used to determine a tracking level. Based at least in part on the tracking level, the image may be used in feature detection, such that the set of detected keypoints is updated. In some cases, the feature detection process may be utilized in response to errors in feature tracking exceeding an allowable threshold. The results of feature tracking and feature detection may then be used to optimize the output of the vSLAM unit, for example, by bundle adjustment. This may include motion data from an inertial motion unit (IMU). In some cases, the vSLAM unit may adapt feature detection procedures to correct for deviation from the conditions in which the vSLAM unit was initialized, at least in part by updating the set of detected keypoints.

In this example, the vSLAM unit may include additional units to improve the robustness of feature detection and tracking operations. For example, the vSLAM unit may include a detection strategy processor to modify the process for updating the set of detected keypoints. The detection strategy processor may receive multiple inputs, including a motion level, an initialization state, and/or a tracking level. Each input may be determined by a unit included in the vSLAM unit, and may be used by the detection strategy processor in determining the pyramid level value and the detector threshold to apply to feature detection. The updated set of detected keypoints, produced by the detection strategy processor, may be applied to feature tracking as a technique to reduce error in feature tracking and to improve the output of the vSLAM unit.

In general, vSLAM permits an AR system, as well as other types of systems that use computer vision (CV) to detect features and objects in the real world, to detect and track objects as the system moves relative to the objects. Because initialization, motion, and tracking errors may adversely affect the accuracy and robustness of the vSLAM unit, systems to improve feature detection and tracking reduce that error and improve the output pose generated by vSLAM operations are provided by embodiments of the present disclosure.

In some embodiments, a method implemented by a computer system is provided. The method includes: receiving a first image by a visual simultaneous localization and mapping (vSLAM) unit, the first image being generated by an optical sensor in communication with the computer system; receiving a motion dataset generated by an inertial measurement unit in communication with the vSLAM unit; determining a motion level by the vSLAM unit using a motion monitor; determining an initialization state by the vSLAM unit using an initializer; determining a tracking level by the vSLAM unit using a tracking performance monitor; and in a first condition, using a detection strategy processor of the vSLAM unit generating a first image pyramid; detecting a plurality of features in the first image pyramid using a first detector threshold; and generating a first set of detected keypoints from the plurality of features at least in part by keypoint fusion and selection; in a second condition, using a detection strategy processor of the vSLAM unit generating a second image pyramid; detecting the plurality of features in the second image pyramid using a second detector threshold, the second detector threshold being less restrictive than the first detector threshold; and generating a second set of detected keypoints at least in part by keypoint fusion and selection; and in a third condition, using a detection strategy processor of the vSLAM unit detecting the plurality of features in the first image according to the first detector threshold; and generating a third set of detected keypoints.

In some embodiments, the first condition is a determination that the initialization state is true and the motion level is true or the initialization state is false; the second condition is a determination that the initialization state is true, the motion level is false, and the tracking level is false; and the third condition is a determination that the initialization state is true, the motion level is false, and the tracking level is true.

In some embodiments, the method further includes: receiving a second image; performing feature tracking on the second image at least in part according to the first set of detected keypoints, the second set of detected keypoints, or the third set of detected keypoints; determining a tracking quality; and in accordance with a determination that the tracking quality is false, generating updated keypoints from the second image.

In some embodiments, the determining an initialization state includes: receiving one or more initialization parameters from an initializer in communication with the computer system; determining an initialization quality value, based at least in part on the one or more initialization parameters; comparing the initialization quality value to a threshold criterion; and in accordance with the initialization quality value satisfying the threshold criterion, determining that the initialization state is true; or in accordance with the initialization quality value not satisfying the threshold criterion, determining that the initialization state is false.

In some embodiments, the determining a motion level includes: receiving the motion dataset from an inertial measurement unit in communication with the computer system; determining a displacement value by a motion monitor in communication with the computer system based at least in part on the motion dataset; comparing the displacement value to a threshold criterion; and in accordance with the displacement value satisfying the threshold criterion, determining that the motion level is true; or in accordance with the displacement value not satisfying the threshold criterion, determining that the motion level is false.

In some embodiments, the determining a tracking level includes: receiving a set of keypoints; tracking the set of keypoints in the first image; selecting a set of inliers from the set of keypoints tracked in the first image; determining an error value from the set of inliers; comparing the error value to an error threshold; and in accordance with the error value satisfying the error threshold, determining that the tracking level is true; or in accordance with the error value not satisfying the error threshold, determining that the tracking level is false.

In some embodiments, the generating the first image pyramid includes generating N downscaled images from the first image, each subsequent image after the first image having a lower average pixel-resolution than an image preceding it in the first image pyramid, wherein N is a pyramid level value corresponding to a nonzero integer.

In some embodiments, the first detector threshold is determined at least in part according to a detector threshold used for initializing a vSLAM unit.

In some embodiments, the first image is received from a camera in communication with a vSLAM unit.

In some embodiments, a computer system is provided. The computer system includes one or more processors and one or more memories storing computer-readable instructions. The computer-readable instructions, upon execution by the one or more processors, configure the computer system to: receive a first image by a visual simultaneous localization and mapping (vSLAM) unit, the first image being generated by an optical sensor in communication with the computer system; receive a motion dataset generated by an inertial measurement unit in communication with the vSLAM unit; determine a motion level by the vSLAM unit using a motion monitor; determine an initialization state by the vSLAM unit using an initializer; determine a tracking level by the vSLAM unit using a tracking performance monitor; and in a first condition, using a detection strategy processor of the vSLAM unit generate a first image pyramid; detect a plurality of features in the first image pyramid using a first detector threshold; and generate a first set of detected keypoints from the plurality of features at least in part by keypoint fusion and selection; in a second condition, using a detection strategy processor of the vSLAM unit generate a second image pyramid; detect the plurality of features in the second image pyramid using a second detector threshold, the second detector threshold being less restrictive than the first detector threshold; and generate a second set of detected keypoints at least in part by keypoint fusion and selection; and in a third condition, using a detection strategy processor of the vSLAM unit detect the plurality of features in the first image according to the first detector threshold; and generate a third set of detected keypoints.

In some embodiments, the first condition is a determination that the initialization state is true and the motion level is true or the initialization state is false; the second condition is a determination that the initialization state is true, the motion level is false, and the tracking level is false; and the third condition is a determination that the initialization state is true, the motion level is false, and the tracking level is true.

In some embodiments, the computer-readable instructions further configure the computer system to: receive a second image; perform feature tracking on the second image at least in part according to the first set of detected keypoints, the second set of detected keypoints, or the third set of detected keypoints; determine a tracking quality; and in accordance with a determination that the tracking quality is false, generate updated keypoints from the second image.

In some embodiments, determining an initialization state includes: receiving one or more initialization parameters from an initializer in communication with the computer system; determining an initialization quality value, based at least in part on the one or more initialization parameters; comparing the initialization quality value to a threshold criterion; and in accordance with the initialization quality value satisfying the threshold criterion, determining that the initialization state is true; or in accordance with the initialization quality value not satisfying the threshold criterion, determining that the initialization state is false.

In some embodiments, determining a motion level includes: receiving a motion dataset from an inertial measurement unit in communication with the computer system; determining a displacement value by a motion monitor in communication with the computer system based at least in part on the motion dataset; comparing the displacement value to a threshold criterion; and in accordance with the displacement value satisfying the threshold criterion, determining that the motion level is true; or in accordance with the displacement value not satisfying the threshold criterion, determining that the motion level is false.

In some embodiments, determining a tracking level includes: receiving a set of keypoints; tracking the set of keypoints in the first image; selecting a set of inliers from the set of keypoints tracked in the first image; determining an error value from the set of inliers; comparing the error value to an error threshold; and in accordance with the error value satisfying the error threshold, determining that the tracking level is true; or in accordance with the error value not satisfying the error threshold, determining that the tracking level is false.

In some embodiments, generating the first image pyramid includes generating N downscaled images from the first image, each subsequent image after the first image having a lower average pixel-resolution than an image preceding it in the first image pyramid, wherein N is a pyramid level value corresponding to a nonzero integer.

In some embodiments, one or more non-transitory computer-storage media are provided. The one or more non-transitory computer-storage media store instructions that, upon execution on a computer system, cause the computer system to perform operations including: receiving a first image by a visual simultaneous localization and mapping (vSLAM) unit, the first image being generated by an optical sensor in communication with the computer system; receiving a motion dataset generated by an inertial measurement unit in communication with the vSLAM unit; determining a motion level by the vSLAM unit using a motion monitor; determining an initialization state by the vSLAM unit using an initializer; determining a tracking level by the vSLAM unit using a tracking performance monitor; and in a first condition, using a detection strategy processor of the vSLAM unit generating a first image pyramid; detecting a plurality of features in the first image pyramid using a first detector threshold; and generating a first set of detected keypoints from the plurality of features at least in part by keypoint fusion and selection; in a second condition, using a detection strategy processor of the vSLAM unit generating a second image pyramid; detecting the plurality of features in the second image pyramid using a second detector threshold, the second detector threshold being less restrictive than the first detector threshold; and generating a second set of detected keypoints at least in part by keypoint fusion and selection; and in a third condition, using a detection strategy processor of the vSLAM unit detecting the plurality of features in the first image according to the first detector threshold; and generating a third set of detected keypoints. The first condition is a determination that the initialization state is true and the motion level is true or the initialization state is false; the second condition is a determination that the initialization state is true, the motion level is false, and the tracking level is false; and the third condition is a determination that the initialization state is true, the motion level is false, and the tracking level is true.

In some embodiments, the one or more non-transitory computer-storage media of claim 17 wherein determining an initialization state includes: receiving one or more initialization parameters from an initializer in communication with the computer system; determining an initialization quality value, based at least in part on the one or more initialization parameters; comparing the initialization quality value to a threshold criterion; and in accordance with the initialization quality value satisfying the threshold criterion, determining that the initialization state is true; or in accordance with the initialization quality value not satisfying the threshold criterion, determining that the initialization state is false.

In some embodiments, determining a motion level includes: receiving a motion dataset from an inertial measurement unit in communication with the computer system; determining a displacement value by a motion monitor in communication with the computer system based at least in part on the motion dataset; comparing the displacement value to a threshold criterion; and in accordance with the displacement value satisfying the threshold criterion, determining that the motion level is true; or in accordance with the displacement value not satisfying the threshold criterion, determining that the motion level is false.

In some embodiments, determining a tracking level includes: receiving a set of keypoints; tracking the set of keypoints in the first image; selecting a set of inliers from the set of keypoints tracked in the first image; determining an error value from the set of inliers; comparing the error value to an error threshold; and in accordance with the error value satisfying the error threshold, determining that the tracking level is true; or in accordance with the error value not satisfying the error threshold, determining that the tracking level is false.

FIG. 1 illustrates an example of a computer system 110 that includes an inertial measurement unit (IMU) 112 and an RGB optical sensor 114 for feature detection and tracking applications, according to an embodiment of the present disclosure. The feature detection and tracking may be implemented by a vSLAM unit 116 of the computer system 110. Generally, the RGB optical sensor 114 generates an RGB image of a real-world environment that includes, for instance, a real-world object 130. In some embodiments, the IMU 112 generates motion data about the motion of the computer system 110 in a three-dimensional environment, where this data includes, for instance, rotation and translation of the IMU 112 with respect to six degrees of freedom (e.g., translation and rotation according to three Cartesian axes). Following an initialization of an AR session (where this initialization can include calibration and tracking), the vSLAM unit 116 renders an optimized output pose 120 of the real-world environment in the AR session, where the optimized output pose 120 describes the pose of the RGB optical sensor 114 at least in part with respect to a map of features 124 detected in the real-world object 130. The optimized output pose 120 describes a coordinate system and a map for placing two dimensional AR objects onto a real-world object representation 122 of the real-world object 130.

In an example, the computer system 110 represents a suitable user device that includes, in addition to the IMU 112 and the RGB optical sensor 114, one or more graphical processing units (GPUs), one or more general purpose processors (GPPs), and one or more memories storing computer-readable instructions that are executable by at least one of the processors to perform various functionalities of the embodiments of the present disclosure. For instance, the computer system 110 can be any of a smartphone, a tablet, an AR headset, or a wearable AR device, and the like.

The IMU 112 may have a known sampling rate (e.g., a time-frequency of data point production) and this value may be stored locally and/or be accessible to the vSLAM unit 116. The RGB optical sensor 114 may be a color camera. The RGB optical sensor 114 and the IMU 112 may have different sampling rates. Typically, the sampling rate of RGB optical sensor 114 is lower than that of the IMU 112. For instance, the RGB optical sensor 114 may have a sampling rate of 30 Hz, while the IMU 112 may have a sampling rate of 100 Hz.

In addition, the IMU 112 and the RGB optical sensor 114, as installed in the computer system 110, may be separated by a transformation (e.g., distance offset, field of view angle difference, etc.). This transformation may be known and its value may be stored locally and/or be accessible to the vSLAM unit 116. During movement of the computer system 110, the RGB optical sensor 114 and the IMU 112 may experience disparate motion relative to the centroid, the center of mass, or another point of rotation of the computer system 110. In some instances, the transformation may lead to error or mismatch in vSLAM optimized output poses. To that end, the computer system may include calibration data. In some instances, the calibration data may be set based only on the transformation. The calibration data may include data associated at least in part with the resolution of the RGB optical sensor 114.

The vSLAM unit 116 may be implemented as specialized hardware and/or a combination of hardware and software (e.g., general purpose processor and computer-readable instructions stored in memory and executable by the general purpose processor). In addition to initializing an AR session, the computer system 110 may perform adaptive feature detection techniques as part of vSLAM processes, as described in reference to FIGS. 2-7.

In an illustrative example of FIG. 1, a smartphone is used for an AR session that shows the real-world environment. In particular, the AR session includes rendering an AR scene that includes a representation of a real-world table on top of which a vase (or some other real-world object) is placed. A virtual object is to be shown in the AR scene. In particular, the virtual object is to be shown on top of the table. As part of detecting how the smartphone is oriented in the real-world environment relative to the table and the vase, the smartphone may initialize a vSLAM unit using images from RGB optical sensor 114 or other camera. The vSLAM unit will define a coordinate system in reference to which it will detect features in the table and the vase. After initialization, the vSLAM unit will detect and track the features as part of the overall AR system. While detecting and tracking features, the phone may monitor accuracy of tracking operations of the vSLAM unit 116, motion level of the computer system 110, and/or initialization quality, and may adapt the feature detection procedure used by the vSLAM unit 116 to improve the robustness of feature detection and tracking.

Figure 2:
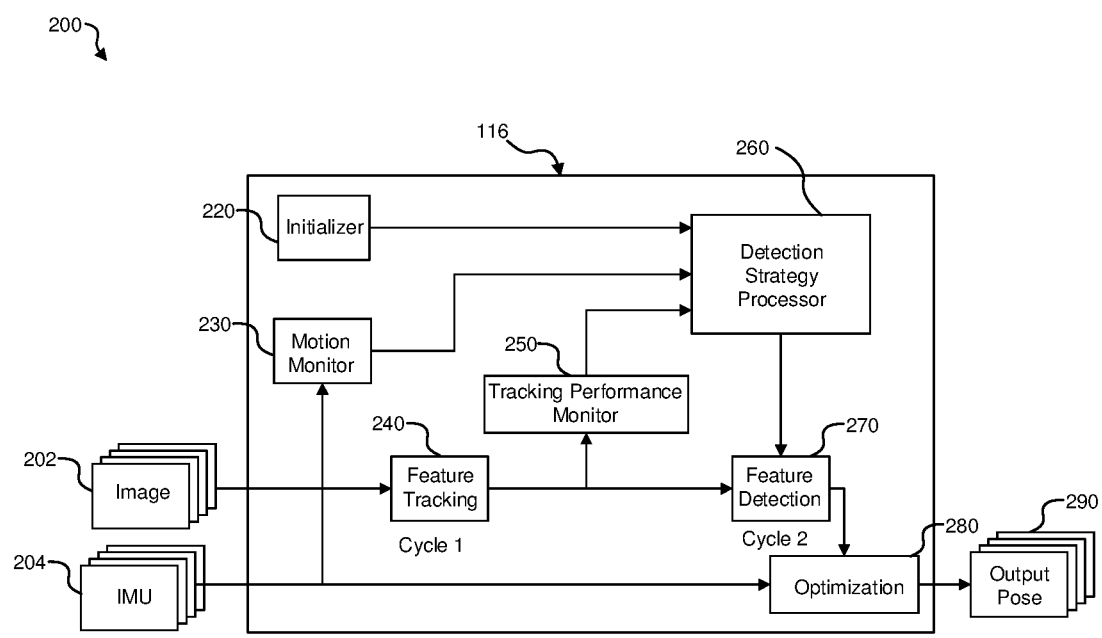
FIG. 2 is a simplified schematic diagram illustrating a vSLAM system according to an embodiment of the present disclosure.

FIG. 2 is a simplified schematic diagram illustrating a vSLAM system 200 according to an embodiment of the present disclosure. In some cases, the vSLAM system 200 performs feature detection and tracking operations following initialization. In some cases, the vSLAM unit 116 receives a first image 202 from an RGB optical sensor (e.g., RGB optical sensor 114 of FIG. 1). The first image 202 may form a part of a set of images received by the vSLAM unit 116, such that the vSLAM unit 116 has generated a set of detected keypoints from a prior-received image of the set of images, either during initialization by an initializer unit 220 or in prior feature detection operations. The vSLAM unit 116 may also receive IMU data 204.

Features detected in a prior received image of the set of images may be tracked in the first image 202 by a feature tracking unit 240. The output of the feature tracking unit 240 may include information describing features that are described as inliers or outliers, based at least in part on whether the change in feature position fits a model prediction of coordinated feature shift, based at least in part on the initialization, the coordinate system, and/or motion of the computer system (e.g., computer system 110 of FIG. 1) relative to its environment. For example, initialization of the vSLAM unit 116 may determine a coordinate system and an output pose such that a feature is predicted to be translated by a given displacement in the first image 202 relative to the prior-received image of the set of images received by the vSLAM unit 116. The displacement may be mapped to the coordinate system generated by the initializer 220 during initialization of the vSLAM unit 116. Based at least in part on a determination of error between the model prediction and the measured displacement, a feature may be designated as an inlier or an outlier.

The feature tracking information generated by the feature tracking unit 240 may be analyzed by a tracking performance monitor 250 to determine a tracking level, which may be a value along a range of values, for example, a value between zero and one along a scale ranging from zero to one. In some cases, the tracking performance monitor 250 may perform one or more operations using inlier data from the feature tracking unit 240 to determine if feature tracking in the first image 202 meets a predetermined criterion of the vSLAM system 200. For example, the tracking performance monitor 250 may integrate the error for inliers tracked in the first image 202, and compare that integrated error to a threshold value $\lambda$. In some cases, the tracking performance monitor 250 may determine a tracking level based on whether the error exceeds $\lambda$, such that the tracking level is false when the error exceeds $\lambda$ and the tracking level is true when the error does not exceed $\lambda$.

The feature tracking level output by tracking performance monitor 250 may be received as an input to detection strategy processor 260, which may also receive input from initializer 220 and from motion monitor 230. In some cases, the initializer 220 may determine an initialization state based at least in part on a measurement of initialization accuracy and/or quality. The initialization state may be represented as a true or false value received by the detection strategy processor 260. In some cases, the initialization state may be determined by calculating the error in the current features tracked in the image with respect to the initial output pose and the coordinate system generated during initialization. For example, the computer system (e.g., computer system 110 of FIG. 1) including the vSLAM unit 116 may move from one environment to another (e.g., from an interior to an exterior environment), such that the initial coordinate system no longer accurately describes the environment surrounding the computer system. In some cases, the vSLAM unit 116 may determine the initialization state to be false when the initialization accuracy crosses a threshold value.

In some cases, the motion monitor 230 may receive IMU data 204, including translation and rotation data in six degrees of freedom, as described in more detail in reference to FIG. 1. The motion monitor 230 may determine a motion level, which may be represented as a true or false value and can be based on accelerometer output and/or gyroscope output. In other embodiments, the motion level may be a value along a range of values, for example, a value between zero and one along a scale ranging from zero to one. In some cases, the motion level may be determined based on one or more operations reducing the IMU data 204 to a single displacement value, then comparing the displacement value to a threshold value, as described in more detail in reference to FIG. 3. The motion level received by the detection strategy processor 260 may be used along with the initialization state and/or the tracking level to modify the operation of a feature detection unit 270 as described in more detail in reference to FIG. 3. The IMU data 204 along with the output of the feature detection unit 270 may be received by an optimization unit 280, to optimize the output pose of an optical sensor (e.g., RGB optical sensor 114 of FIG. 1). In some cases, optimization may include bundle adjustment (BA) operations. BA operations may adjust an output pose 290 generated by the vSLAM unit 116 to minimize a cost function that quantifies an error in fitting a model to parameters including, but not limited to, camera poses and coordinates in the coordinate map associated with features detected in a three dimensional environment (e.g., features 124 of FIG. 1).

Figure 3:
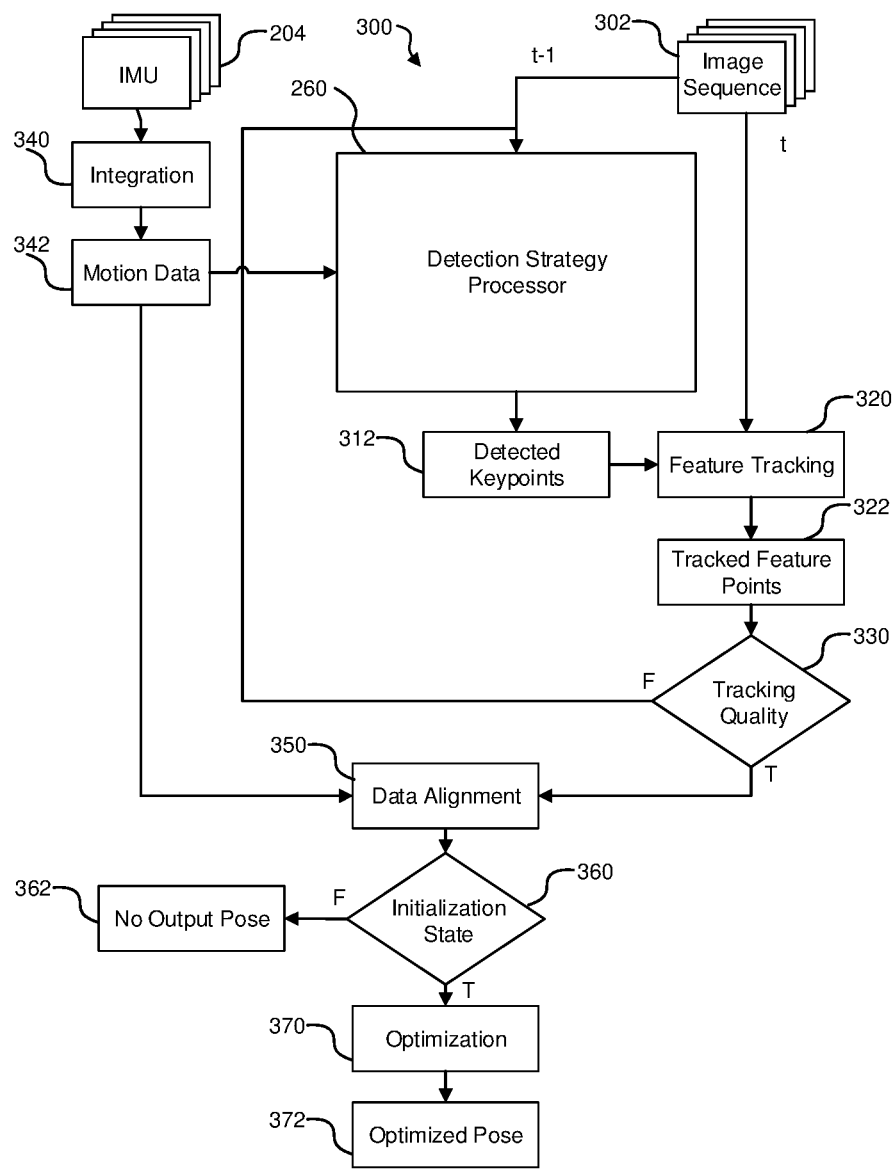
FIG. 3 is a simplified schematic diagram illustrating a technique for adaptive feature detection according to an embodiment of the present disclosure.

FIG. 3 is a simplified schematic diagram illustrating a technique 300 for adaptive feature detection according to an embodiment of the present disclosure. In some cases, motion data 342 are generated from IMU data 204 by integration 340, where the integration 340 converts acceleration data in six degrees of freedom to a displacement value. For example, the translational and rotational acceleration measured by accelerometers included in an IMU (e.g., IMU 112 of FIG. 1) may be integrated over three spatial dimensions to generate a displacement value in units of length (e.g., meters). In some cases, the motion data 342 is received by the detection strategy processor 260. The detection strategy processor 260, as described in reference to FIG. 2, may receive an image t−1 forming part of a set of images 302. The detection strategy processor 260 may generate a set of detected keypoints 312 from the image t−1 based at least in part on the motion data, the initialization state, and/or the tracking level. The set of detected keypoints 312 may be applied in feature tracking 320 of the features in a subsequent image t from the set of images 302. A plurality of tracked feature points 322 produced during feature tracking 320 are used to determine tracking quality 330, as described in more detail in reference to FIG. 2.

In some cases, the tracking quality fails to satisfy a predetermined threshold, prompting the detection strategy processor 260 to repeat detection operations and generate another set of detected keypoints 312. As an example, if the tracking quality is poor, for example, because the image contains few elements that can be tracked, the detection threshold can be reduced and/or the pyramid level can be increased as described herein. In some cases, the tracking quality 330 satisfies the predetermined threshold, following which the vSLAM unit may implement data alignment 350 to compensate for motion of the computer system as measured by the IMU, and/or may determine an updated initialization state 360. In some cases, the initialization state 360 is false, such that the vSLAM unit may not update the output pose 362. In some cases, the initialization state 360 is true, such that the vSLAM unit may implement optimization 370 of the output pose as described in more detail in reference to FIG. 2, thereby generating an optimized pose 372.

In some cases, the adaptive feature detection technique 300 includes multiple iterations of the process, such that each image in the set of images 302 is processed as image t−1 in the detection strategy processor 260 and subsequently as image t in feature tracking 320. In some cases, the feature tracking quality satisfies a predetermined threshold, such that multiple consecutive images in the set of images 302 are processed in feature tracking 320 using the same set of detected keypoints 312, without updating the set of detected keypoints 312, as, for example, when the tracking quality 330 remains true for multiple tracking cycles. In some cases, motion data 342 or tracking quality 330 may necessitate redefining the set of detected keypoints 312, such that the detection strategy processor 260 receives the image t−1 in the set of images 302 and performs keypoint detection operations as described in more detail in reference to FIG. 4 below.

Figure 4:
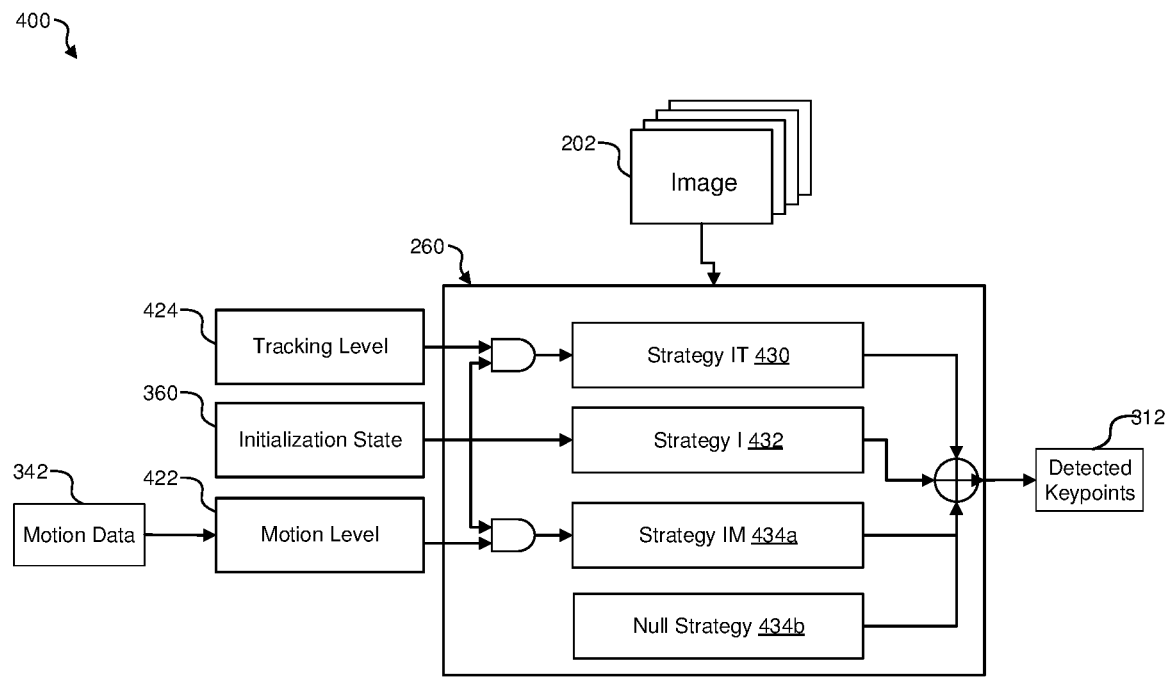
FIG. 4 is a simplified schematic diagram illustrating a technique for generating a set of detected keypoints according to an embodiment of the present disclosure.

FIG. 4 is a simplified schematic diagram illustrating a technique 400 for generating a set of detected keypoints according to an embodiment of the present disclosure. In some cases, the detection strategy processor 260, as described in reference to FIGS. 2-3, receives an image 202 (e.g., image 202 of FIG. 2 and the image t−1 of FIG. 3) from a set of images (e.g., set of images 302 of FIG. 2). In some cases, the detection strategy processor 260 also receives an initialization state 360, a motion level 422, and a tracking level 424, as described in more detail in reference to FIG. 2. In some cases, the motion level is determined based on comparing the motion data 342 to a threshold displacement value to generate a true or false value. In FIG. 4, I represents the initialization state being true, T represents the tracking level being true, and M represents the motion level being true. Strategies described in FIG. 4 are named for which of the determined parameters are true, with false parameters omitted. Operations internal to the detection strategy processor may include, but are not limited to, implementing one or more keypoint detection strategies in accordance with the combination of initialization state 360, motion level 422, and/or tracking level 424 values. The detection strategy processor 260 may determine a pyramid level value and/or a detector threshold value based at least in part on the combination of values, such that the set of detected keypoints 312 is generated from the image 202. In some cases, the set of detected keypoints 312 may include the output of a single detection strategy per cycle. In some cases, the detection strategy processor 260 may implement a single strategy per cycle, based at least in part on the combination of values received.

Figure 5A:
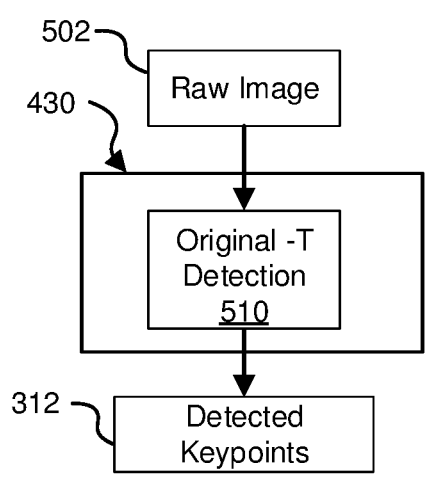
FIG. 5A is a simplified schematic diagram illustrating a technique for generating a set of detected keypoints according to an embodiment of the present disclosure.
Figure 5B:
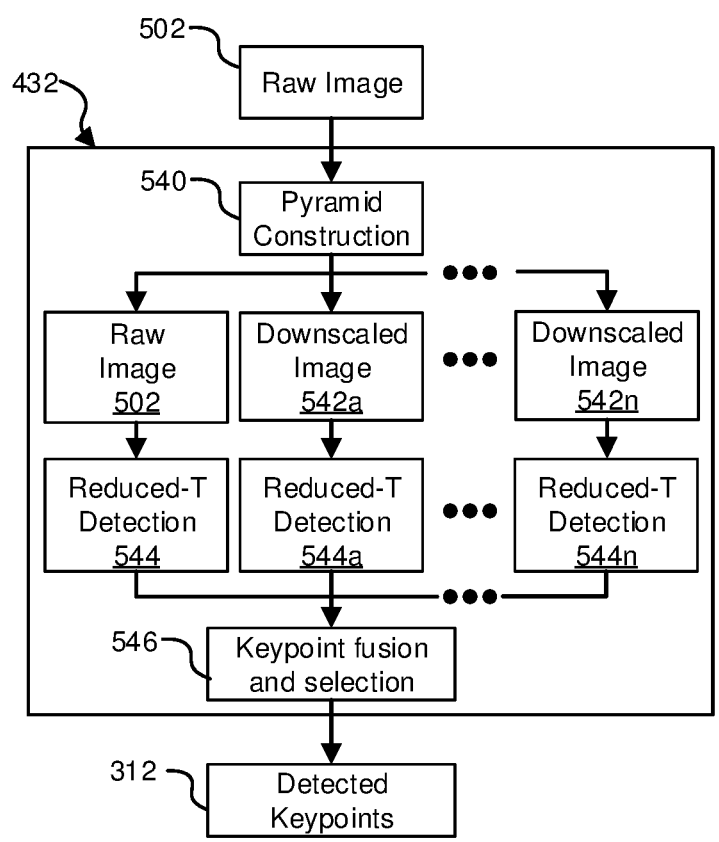
FIG. 5B is a simplified schematic diagram illustrating a technique for generating a set of detected keypoints according to an embodiment of the present disclosure.
Figure 5C:
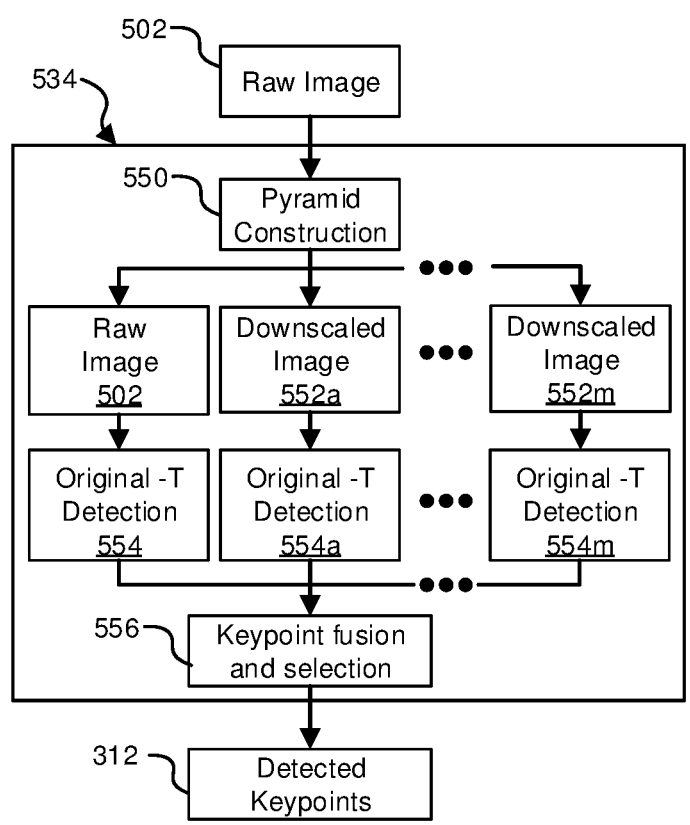
FIG. 5C is a simplified schematic diagram illustrating a technique for generating a set of detected keypoints according to an embodiment of the present disclosure.

In general, the pyramid level value, as described in more detail in reference to FIGS. 5A-5C, describes a number of downscaling steps by which additional images are generated from the image 202 for subsequent processing in keypoint detection according to a detector threshold. The detector threshold in keypoint detection refers to the standard by which measured features in the image 202 are either recorded in the set of detected keypoints 312 or are discarded. In some cases, the detection strategy processor employs as a first detector threshold that the threshold applied during initialization.

In some cases, the initialization state 360 and the tracking level 424 are true, while only the motion level 422 is false, corresponding to satisfactory initialization, tracking and motion. In accordance with this combination of values, the detection strategy processor 260 may implement a keypoint detection strategy IT 430 using a pyramid level value of zero and without modifying the detector threshold from a default value or current value. Keypoint detection strategy IT 430 can be referred to as the default keypoint detection strategy that may be implemented when the vSLAM unit is initialized and when the tracking error and motion level are nominal.

In some cases, only the initialization state 360 is true, while the tracking level 424 and the motion level 422 are false. In accordance with this combination of values, the detection strategy processor 260 may implement a keypoint detection strategy I 432 using a pyramid level value N, where N is an integer greater than zero. Keypoint detection strategy I 432 can be referred to as the tracking-error keypoint detection strategy that may be implemented when the vSLAM unit is initialized and motion level is nominal, but the vSLAM unit measures tracking error outside a predetermined threshold. The pyramid level value may be determined based at least in part on parameters of the hardware making up the computer system (e.g., computer system 110 of FIG. 1). In some cases, in detection strategy I 432 the detection strategy processor 260 may reduce the detector threshold to a reduced threshold, being less restrictive than the default or current threshold. In some cases, performing keypoint detection on the N images according at least in part to the reduced detector threshold permits the detection strategy I 432 to detect a larger number of keypoints relative to keypoint detection strategy IT 430, such that the set of detected keypoints 312 permit improved tracking based on a higher quality detection result, as described in more detail in reference to FIG. 5.

In some cases, the initialization state 360 and the motion level 422 are true, while the tracking level 424 is false. In accordance with this combination of values, the detection strategy processor 260 may implement a keypoint detection strategy IM 434a using the nonzero integer pyramid level value N and the default value or current value for the detector threshold. Keypoint detection strategy IM 434a can be referred to as the high-motion keypoint detection strategy that may be implemented when the vSLAM unit is initialized and feature tracking is nominal, but the vSLAM unit determines motion outside a predetermined threshold. In some cases, the motion level being true indicates that the displacement, and thus the motion of the computer system as measured by the IMU, has crossed the threshold value (e.g. the computer system may be moving "fast" and/or may have experienced non-optimum acceleration during the recent timeframe over which the IMU measurement was generated). Detection strategy IM 434a may include a nonzero pyramid level value to improve the robustness of feature detection by selecting features that appear across pyramid levels, as described in more detail in reference to FIG. 5, but leaves the detector threshold value unchanged, at least in part because the tracking level indicates that tracking quality satisfies a predetermined threshold. As an illustrative example, strategy IM 434 may be applied by the detection strategy processor in response to the motion level crossing from false to true as a result of the environment around the computer system moving with the computer system in coincident motion (e.g., a smart phone held in the passenger compartment of a turning or accelerating vehicle) such that the vSLAM unit (e.g., the vSLAM unit 116 of FIGS. 1-2) may track keypoints in the environment, while registering a displacement outside a predetermined threshold.

In some cases, the initialization state 360 may be false. In accordance with this combination of values, the detection strategy processor 260 may implement a keypoint detection null strategy 434b using a nonzero integer pyramid level value N and the default value or current value for the detector threshold. The keypoint detection null strategy 434b can be referred to as the initialization keypoint detection strategy that may be implemented when the detection strategy processor determines that the vSLAM unit is not initialized. The term null refers to none of the parameters being true, in which case the most robust detection approach may be applied to compensate for inadequate initialization. The keypoint detection null strategy 434b may correspond to the same parameters as strategy IM 434a, at least in part to correct for the initialization of the vSLAM unit no longer providing an accurate initial coordinate mapping or initial pose to produce accurate vSLAM operations, including, but not limited to, optimized output poses. As described in more detail in reference to FIG. 3, the initialization state may be an important parameter at several points in the vSLAM technique 300, such that the vSLAM unit may leave the output pose unchanged when the initialization state 360 is false. As such, in some cases, the detection strategy processor employs the keypoint detection null strategy 434b until the vSLAM unit completes reinitialization. In some cases, the detection strategy processor may employ the detector threshold used for initialization as the detector threshold employed in the keypoint detection null strategy 434b.

FIGS. 5A-5C each are simplified schematic diagrams illustrating a technique for generating a set of detected keypoints (e.g., set of detected keypoints 312 of FIG. 3) according to an embodiment of the present disclosure. As described in more detail in reference to FIG. 4, the detection strategy processor (e.g., detection strategy processor 260 of FIG. 4) may implement a detection strategy in accordance with the combination of initialization state, motion level, and/or tracking level values. The four strategies described in reference to FIG. 4 may include different combinations of detector threshold values and pyramid level values, as described in more detail, below.

FIG. 5A is a simplified schematic diagram illustrating a technique for generating a set of detected keypoints according to an embodiment of the present disclosure. In some cases, as described in reference to FIG. 4, the detector strategy processor employs detection strategy IT 430, in accordance with nominal operation of the vSLAM unit (e.g., vSLAM unit 116 of FIG. 1). As such, the detection strategy IT 430 may include the detector strategy processor receiving a raw image 502 (e.g., image 202 of FIG. 2, and image t−1 of FIG. 3). In some cases, the detection strategy processor (e.g., detection strategy processor 260 of FIG. 2) generates a set of detected keypoints 312 by detecting features in the raw image 502 using the default or current threshold value, according to original-T detection 510. In some cases, the original-T detection 510 does not include a pyramid level, and is included as an option by the detection strategy processor to account for accumulated errors in feature tracking over a number of cycles of feature tracking by the vSLAM system.

FIG. 5B is a simplified schematic diagram illustrating a technique for generating a set of detected keypoints according to an embodiment of the present disclosure. In some cases, as described in reference to FIG. 4, the detector strategy processor employs detection strategy I 432, in accordance with operation of the vSLAM unit under conditions where motion is satisfactory but tracking is unsatisfactory. As such, the detection strategy I 432 may generate one or more images by pyramid construction 540, according to a pyramid level value N, where N is a nonzero integer. The detection strategy processor may process the raw image 502 and a set of N downscaled images 542 a-n, where a and n are integers greater than zero and n is the pyramid level value. In some cases, N is equal to a. In detection strategy I 432, each downscaled image 542a through downscaled image 542n may have a pixel-resolution lower than that of the raw image 502, and each may have a progressively lower pixel resolution than the preceding downscaled image 542a-n in the image pyramid. In some cases, downscaling may be based at least in part on a downscaling factor (e.g., binomial filter downscaling) or it may be based on a spatially weighted downscaling to emphasize one or more regions in the raw image 502. Pyramid construction 540 may include, but is not limited to, Gaussian, laplacian, and steerable pyramid construction techniques. Gaussian methods, for example, may employ a contextual smoothing function based on a Gaussian filter. In contrast, steerable pyramid methods may employ multi-scale, multi-orientation bandpass filters to modify the scaling operation for each level of the image pyramid. In some cases, in accordance with strategy I 432, the detection strategy processor generates the set of detected keypoints 312 by detecting features in the raw image 502 using a reduced detector threshold value, according to reduced-T detection 544. Accordingly, the detection strategy processor may use reduced T detection 544a-n for each of the downscaled images 542a-n. In some cases, following keypoint detection 544-544n, the detection strategy I 432 may include keypoint fusion and selection 546. Keypoint fusion and selection 546 may include selecting the set of detected keypoints 312 by combining the results of reduced-T detection 544 with that of each downscaled image 542a-n, fusing keypoints that are likely to be associated with the same feature across the images in the image pyramid, and selecting keypoints based at least in part on a score for the fused keypoints. In some cases, the fusion of keypoints is based at least in part on spatial localization of keypoints relative to each other in the coordinate system generated during initialization. In some cases, the detection strategy I 432 employs other techniques, such as keypoint descriptor fusion, which includes comparison of the contextual information for each keypoint in an effort to identify two or more keypoints with each other. Following keypoint fusion and selection the detection strategy I 432 may produce the set of detected keypoints 312 for use by the technique 300.

FIG. 5C is a simplified schematic diagram illustrating a technique for generating a set of detected keypoints according to an embodiment of the present disclosure. In some cases, the detection strategy processor implements detection strategy IM or the null strategy (e.g., strategies 434a-b of FIG. 4), according to detection operation 534. In some cases, both detection strategies employ a similar approach, using a pyramid of N levels and a default or current detector threshold value. As described in more detail in reference to detection strategy I 432, the raw image 502 may be downscaled by pyramid construction 550 into m downscaled images 552a-m, where m is a nonzero integer equivalent to the pyramid level value associated with operation 534. In some cases, operation 534 includes detection of keypoints for the raw image 502 according to original-T detection 554 and each of the downscaled images according to original-T detection 554a-m, following which the detected keypoints are combined by keypoint fusion and selection 556, as previously described in reference to detection strategy I 432. In some cases, operation 534 generates the set of detected keypoints 312.

Figure 6:
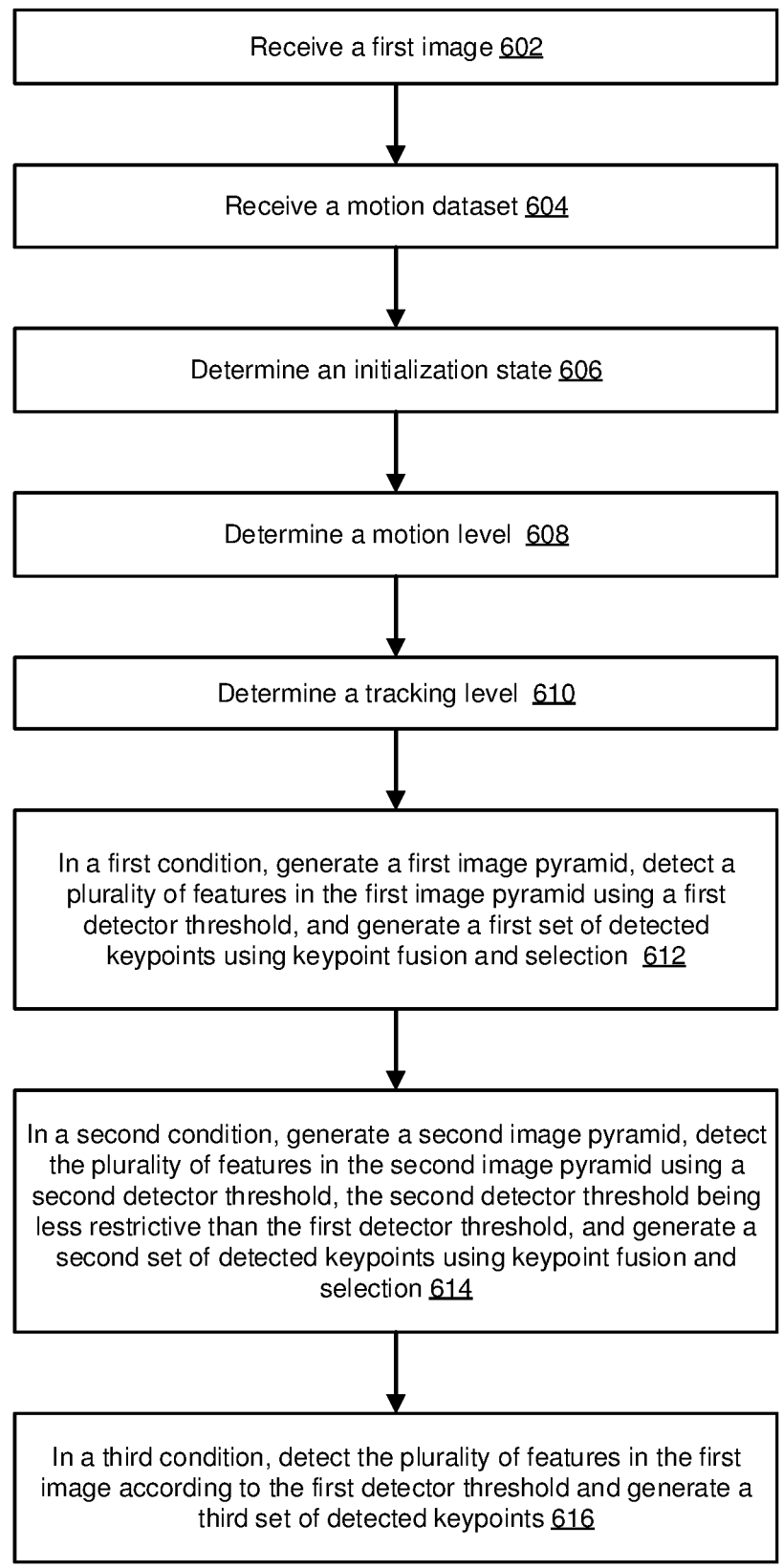
FIG. 6 is a simplified flowchart illustrating a method of performing adaptive feature detection according to an embodiment of the present disclosure.

FIG. 6 is a simplified flowchart illustrating methods of adaptive feature detection using a vSLAM unit according to at least one embodiment of the present disclosure. The flow is described in connection with a computer system that is an example of the computer systems described herein above. Some or all of the operations of the flows can be implemented via specific hardware on the computer system and/or can be implemented as computer-readable instructions stored on a non-transitory computer-readable medium of the computer system. As stored, the computer-readable instructions represent programmable modules that include code executable by a processor of the computer system. The execution of such instructions configures the computer system to perform the respective operations. Each programmable module in combination with the processor represents a means for performing a respective operation (s). While the operations are illustrated in a particular order, it should be understood that no particular order is necessary and that one or more operations may be omitted, skipped, and/or reordered.

The method includes receiving a first image (602). As described in more detail in reference to FIG. 1, the first image may form a part of a set of images received by the vSLAM unit (e.g., vSLAM unit 116 of FIG. 1) from an optical sensor (e.g., RGB optical sensor 114 of FIG. 1). Optionally, the first image is received from a camera in communication with the vSLAM unit. In some cases, the camera may produce images at a raw or native pixel-resolution.

The method further includes receiving a motion dataset (604). As described in more detail in reference to FIG. 2, the computer system (e.g., computer system 110 of FIG. 1) may include an IMU. The IMU may measure motion in six degrees of freedom, and provide motion data to the vSLAM unit. In some cases, the vSLAM unit processes the motion data to determine a displacement value, equivalent to a translational movement in a period of time.

The method further includes determining an initialization state (606). Optionally, determining an initialization state includes receiving one or more initialization parameters from an initializer in communication with the computer system, determining an initialization quality value, based at least in part on the one or more initialization parameters, and comparing the displacement value to a threshold criterion. In accordance with the initialization quality value satisfying the threshold criterion, the method can include determining that the initialization state is true. Alternatively, in accordance with the initialization quality value not satisfying the threshold criterion, the method can include determining that the initialization state is false. As described in more detail in reference to FIG. 1, the initialization may provide an initial output pose and an initial coordinate mapping for the vSLAM unit by which the vSLAM unit detects and tracks features in an image of a set of images.

The method further includes determining a motion level (608). In an embodiment, determining a motion level includes receiving the motion dataset from an inertial measurement unit in communication with the computer system and determining a displacement value by a motion monitor in communication with the computer system based at least in part on the motion dataset. In this embodiment, the method also includes comparing the displacement value to a threshold criterion and, in accordance with the displacement value, satisfying the threshold criterion, determining that the motion level is true. Alternatively, in accordance with the displacement value not satisfying the threshold criterion, the method can include determining that the motion level is false. In some cases, the motion level is determined based on displacement and/or, as described in more detail in reference to FIG. 3, the motion level may reflect acceleration of the computer system.

The method further includes determining a tracking level (610). In a specific embodiment, determining a tracking level includes receiving a set of keypoints and tracking the set of keypoints in the first image. In this specific embodiment, the method also includes selecting a set of inliers from the set of keypoints tracked in the first image, determining an error value from the set of inliers, and comparing the error value to an error threshold. If the error value satisfies the error threshold the tracking level is determined to be true. If the error value does not satisfy the error threshold, the tracking level is determined to be false. As described in more detail in reference to FIG. 3, the tracking level may reflect the integrated error based at least in part on inliers tracked in a set of detected keypoints.

The method further includes, in accordance with a determination that the initialization state is true and the motion level is true, or that the initialization state is false (i.e., a first condition), generating a first image pyramid, detecting a plurality of features in the first image pyramid using a first detector threshold, and generating a set of detected keypoints at least in part by keypoint fusion and selection (612). Optionally, generating the first image pyramid includes generating N downscaled images from the first image, each subsequent image after the first image having a lower average pixel-resolution than the image preceding it in the image pyramid, wherein N is a pyramid level value corresponding to a nonzero integer. Optionally, the first detector threshold is determined at least in part according to a detector threshold used for initializing the vSLAM unit.

The method further includes, in accordance with a determination that the initialization state is true, the motion level is false, and the tracking level is false (i.e., a second condition), generating a second image pyramid, detecting the plurality of features in the second image pyramid using a second detector threshold, the second detector threshold being less restrictive than the first detector threshold, and generating a second set of detected keypoints at least in part by keypoint fusion and selection (614).

The method further includes, in accordance with a determination that the initialization state is true, the motion level is false, and the tracking level is true (i.e., a third condition), detecting the plurality of features in the first image according to the first detector threshold; and generating a third set of detected keypoints (616).

In a particular embodiment, the method further includes receiving a second image, performing feature tracking on the second image at least in part according to the set of detected keypoints, determining a tracking quality based at least in part on a plurality of tracked feature points in the second image, and, in accordance with a determination that the tracking quality is false, generating updated keypoints from the second image; and replacing the set of detected keypoints with the updated keypoints.

It should be appreciated that the specific steps illustrated in FIG. 6 provide a particular method of detecting features in an image according to an embodiment of the present disclosure. Other sequences of steps may also be performed according to alternative embodiments. For example, alternative embodiments of the present disclosure may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
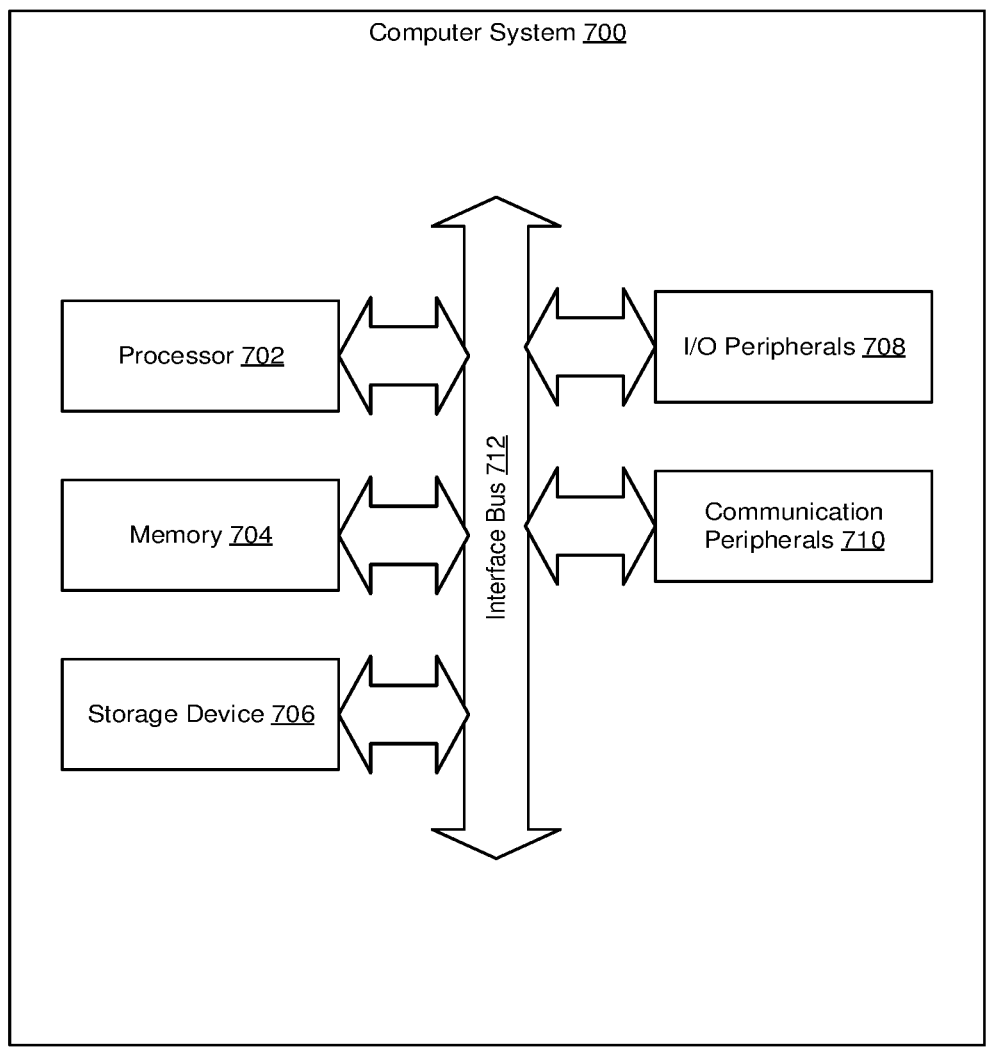
FIG. 7 illustrates an example computer system, according to embodiments of the present disclosure.

FIG. 7 illustrates examples of components of a computer system 700 according to certain embodiments. The computer system 700 is an example of the computer system described herein above. Although these components are illustrated as belonging to a same computer system 700, the computer system 700 can also be distributed.

The computer system 700 includes at least a processor 702, a memory 704, a storage device 706, input/output peripherals (I/O) 708, communication peripherals 710, and an interface bus 712. The interface bus 712 is configured to communicate, transmit, and transfer data, controls, and commands among the various components of the computer system 700. The memory 704 and the storage device 706 include computer-readable storage media, such as RAM, ROM, electrically erasable programmable read-only memory (EEPROM), hard drives, CD-ROMs, optical storage devices, magnetic storage devices, electronic non-volatile computer storage, for example memory, and other tangible storage media. Any of such computer readable storage media can be configured to store instructions or program codes embodying aspects of the disclosure. The memory 704 and the storage device 706 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 700.

Further, the memory 704 includes an operating system, programs, and applications. The processor 702 is configured to execute the stored instructions and includes, for example, a logical processing unit, a microprocessor, a digital signal processor, and other processors. The memory 704 and/or the processor 702 can be virtualized and can be hosted within another computer system of, for example, a cloud network or a data center. The I/O peripherals 708 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 708 are connected to the processor 702 through any of the ports coupled to the interface bus 712. The communication peripherals 710 are configured to facilitate communication between the computer system 700 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computer system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method implemented by a computer system, the method comprising:
    receiving a first image by a visual simultaneous localization and mapping (vSLAM) unit, the first image being generated by an optical sensor in communication with the computer system;
    receiving a motion dataset generated by an inertial measurement unit in communication with the vSLAM unit;
    determining a motion level by the vSLAM unit using a motion monitor;
    determining an initialization state by the vSLAM unit using an initializer;
    determining a tracking level by the vSLAM unit using a tracking performance monitor; and
    in a first condition, using a detection strategy processor of the vSLAM unit:
        generating a first image pyramid;
        detecting a plurality of features in the first image pyramid using a first detector threshold; and
        generating a first set of detected keypoints from the plurality of features at least in part by keypoint fusion and selection;
    in a second condition, using a detection strategy processor of the vSLAM unit:
        generating a second image pyramid;
        detecting the plurality of features in the second image pyramid using a second detector threshold, the second detector threshold being less restrictive than the first detector threshold; and
        generating a second set of detected keypoints at least in part by keypoint fusion and selection; and in a third condition, using a detection strategy processor
of the vSLAM unit:
detecting the plurality of features in the first image
according to the first detector threshold; and
generating a third set of detected keypoints.

2. The method of claim 1, wherein:
the first condition is a determination that the initialization
state is true and the motion level is true or the initialization state is false;
the second condition is a determination that the initialization state is true, the motion level is false, and the
tracking level is false; and
the third condition is a determination that the initialization
state is true, the motion level is false, and the tracking
level is true.

3. The method of claim 1, further comprising:
receiving a second image;
performing feature tracking on the second image at least
in part according to the first set of detected keypoints,
the second set of detected keypoints, or the third set of
detected keypoints;
determining a tracking quality; and
in accordance with a determination that the tracking
quality is false, generating updated keypoints from the
second image.

4. The method of claim 1, wherein determining an initialization state comprises:
receiving one or more initialization parameters from an
initializer in communication with the computer system;
determining an initialization quality value, based at least
in part on the one or more initialization parameters;
comparing the initialization quality value to a threshold
criterion; and
in accordance with the initialization quality value satisfying the threshold criterion, determining that the initialization state is true; or
in accordance with the initialization quality value not
satisfying the threshold criterion, determining that the
initialization state is false.

5. The method of claim 1, wherein determining a motion
level comprises:
receiving the motion dataset from an inertial measurement
unit in communication with the computer system;
determining a displacement value by a motion monitor in
communication with the computer system based at least
in part on the motion dataset;
comparing the displacement value to a threshold criterion;
and
in accordance with the displacement value satisfying the
threshold criterion, determining that the motion level is
true; or
in accordance with the displacement value not satisfying
the threshold criterion, determining that the motion
level is false.

6. The method of claim 1, wherein determining a tracking
level comprises:
receiving a set of keypoints;
tracking the set of keypoints in the first image;
selecting a set of inliers from the set of keypoints tracked
in the first image;
determining an error value from the set of inliers;
comparing the error value to an error threshold; and
in accordance with the error value satisfying the error
threshold, determining that the tracking level is true; or
in accordance with the error value not satisfying the error
threshold, determining that the tracking level is false.

7. The method of claim 1, wherein generating the first
image pyramid comprises generating N downscaled images
from the first image, each subsequent image after the first
image having a lower average pixel-resolution than an
image preceding it in the first image pyramid, wherein N is
a pyramid level value corresponding to a nonzero integer.

8. The method of claim 1, wherein the first detector
threshold is determined at least in part according to a
detector threshold used for initializing a vSLAM unit.

9. The method of claim 1, wherein the first image is
received from a camera in communication with a vSLAM
unit.

10. A computer system, comprising:
one or more processors; and
one or more memories storing computer-readable instructions that, upon execution by the one or more processors, configure the computer system to:
receive a first image by a visual simultaneous localization and mapping (vSLAM) unit, the first image
being generated by an optical sensor in communication with the computer system;
receive a motion dataset generated by an inertial measurement unit in communication with the vSLAM
unit;
determine a motion level by the vSLAM unit using a
motion monitor;
determine an initialization state by the vSLAM unit
using an initializer;
determine a tracking level by the vSLAM unit using a
tracking performance monitor; and
in a first condition, using a detection strategy processor
of the vSLAM unit:
generate a first image pyramid;
detect a plurality of features in the first image
pyramid using a first detector threshold; and
generate a first set of detected keypoints from the
plurality of features at least in part by keypoint
fusion and selection;
in a second condition, using a detection strategy processor of the vSLAM unit: generate a second image
pyramid;
detect the plurality of features in the second image
pyramid using a second detector threshold, the
second detector threshold being less restrictive
than the first detector threshold; and
generate a second set of detected keypoints at least in
part by keypoint fusion and selection; and
in a third condition, using a detection strategy processor of the vSLAM unit:
detect the plurality of features in the first image
according to the first detector threshold; and
generate a third set of detected keypoints.

11. The computer system of claim 10, wherein:
the first condition is a determination that the initialization
state is true and the motion level is true or the initialization state is false;
the second condition is a determination that the initialization state is true, the motion level is false, and the
tracking level is false; and
the third condition is a determination that the initialization
state is true, the motion level is false, and the tracking
level is true.

12. The computer system of claim 10, wherein the computer-readable instructions further configure the computer
system to:

receive a second image;
perform feature tracking on the second image at least in part according to the first set of detected keypoints, the second set of detected keypoints, or the third set of detected keypoints;
determine a tracking quality; and
in accordance with a determination that the tracking quality is false, generate updated keypoints from the second image.

13. The computer system of claim 10, wherein determining an initialization state comprises:
receiving one or more initialization parameters from an initializer in communication with the computer system;
determining an initialization quality value, based at least in part on the one or more initialization parameters;
comparing the initialization quality value to a threshold criterion; and
in accordance with the initialization quality value satisfying the threshold criterion, determining that the initialization state is true; or
in accordance with the initialization quality value not satisfying the threshold criterion, determining that the initialization state is false.

14. The computer system of claim 10, wherein determining a motion level comprises:
receiving a motion dataset from an inertial measurement unit in communication with the computer system;
determining a displacement value by a motion monitor in communication with the computer system based at least in part on the motion dataset;
comparing the displacement value to a threshold criterion; and
in accordance with the displacement value satisfying the threshold criterion, determining that the motion level is true; or
in accordance with the displacement value not satisfying the threshold criterion, determining that the motion level is false.

15. The computer system of claim 10, wherein determining a tracking level comprises:
receiving a set of keypoints;
tracking the set of keypoints in the first image;
selecting a set of inliers from the set of keypoints tracked in the first image;
determining an error value from the set of inliers;
comparing the error value to an error threshold; and
in accordance with the error value satisfying the error threshold, determining that the tracking level is true; or
in accordance with the error value not satisfying the error threshold, determining that the tracking level is false.

16. The computer system of claim 10, wherein generating the first image pyramid comprises generating N downscaled images from the first image, each subsequent image after the first image having a lower average pixel-resolution than an image preceding it in the first image pyramid, wherein N is a pyramid level value corresponding to a nonzero integer.

17. One or more non-transitory computer-storage media storing instructions that, upon execution on a computer system, cause the computer system to perform operations comprising:
receiving a first image by a visual simultaneous localization and mapping (vSLAM) unit, the first image being generated by an optical sensor in communication with the computer system;
receiving a motion dataset generated by an inertial measurement unit in communication with the vSLAM unit;
determining a motion level by the vSLAM unit using a motion monitor;
determining an initialization state by the vSLAM unit using an initializer;
determining a tracking level by the vSLAM unit using a tracking performance monitor; and
in a first condition, using a detection strategy processor of the vSLAM unit:
generating a first image pyramid;
detecting a plurality of features in the first image pyramid using a first detector threshold; and
generating a first set of detected keypoints from the plurality of features at least in part by keypoint fusion and selection;
in a second condition, using a detection strategy processor of the vSLAM unit:
generating a second image pyramid;
detecting the plurality of features in the second image pyramid using a second detector threshold, the second detector threshold being less restrictive than the first detector threshold; and
generating a second set of detected keypoints at least in part by keypoint fusion and selection; and
in a third condition, using a detection strategy processor of the vSLAM unit:
detecting the plurality of features in the first image according to the first detector threshold; and
generating a third set of detected keypoints,
wherein:
the first condition is a determination that the initialization state is true and the motion level is true or the initialization state is false;
the second condition is a determination that the initialization state is true, the motion level is false, and the tracking level is false; and
the third condition is a determination that the initialization state is true, the motion level is false, and the tracking level is true.

18. The one or more non-transitory computer-storage media of claim 17, wherein determining an initialization state comprises:
receiving one or more initialization parameters from an initializer in communication with the computer system;
determining an initialization quality value, based at least in part on the one or more initialization parameters;
comparing the initialization quality value to a threshold criterion; and
in accordance with the initialization quality value satisfying the threshold criterion, determining that the initialization state is true; or
in accordance with the initialization quality value not satisfying the threshold criterion, determining that the initialization state is false.

19. The one or more non-transitory computer-storage media of claim 17, wherein determining a motion level comprises:
receiving a motion dataset from an inertial measurement unit in communication with the computer system;
determining a displacement value by a motion monitor in communication with the computer system based at least in part on the motion dataset;
comparing the displacement value to a threshold criterion; and
in accordance with the displacement value satisfying the threshold criterion, determining that the motion level is true; or in accordance with the displacement value not satisfying the threshold criterion, determining that the motion level is false.

20. The one or more non-transitory computer-storage media of claim 17, wherein determining a tracking level comprises:
   receiving a set of keypoints;
   tracking the set of keypoints in the first image;
   selecting a set of inliers from the set of keypoints tracked in the first image;
   determining an error value from the set of inliers;
   comparing the error value to an error threshold; and
   in accordance with the error value satisfying the error threshold, determining that the tracking level is true; or
   in accordance with the error value not satisfying the error threshold, determining that the tracking level is false.

* * * * *